(12) United States Patent
Hasegawa et al.

(10) Patent No.: US 6,375,174 B2
(45) Date of Patent: Apr. 23, 2002

(54) CURVED HELICAL COMPRESSION SPRING

(75) Inventors: Keiji Hasegawa; Toshiyuki Imaizumi, both of Toyoake (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/767,267

(22) Filed: Jan. 23, 2001

(30) Foreign Application Priority Data

Jan. 28, 2000 (JP) ............................................ 12-020082

(51) Int. Cl.[7] .............................. F16F 1/04; B60G 15/06
(52) U.S. Cl. ........................ 267/167; 267/180; 267/166
(58) Field of Search ................................ 267/166–180, 267/287

(56) References Cited

U.S. PATENT DOCUMENTS

| | | | |
|---|---|---|---|
| 4,744,549 A | * | 5/1988 | Vonder Ohe et al. ........ 267/287 |
| 4,903,985 A | | 2/1990 | Muhr et al. |
| 5,310,167 A | * | 5/1994 | Noll, Jr. ...................... 267/33 |
| 5,791,638 A | * | 8/1998 | Balsells ...................... 267/167 |
| 6,264,183 B1 | * | 7/2001 | Meier et al. ................ 267/169 |

FOREIGN PATENT DOCUMENTS

| | | |
|---|---|---|
| EP | 0 526 689 A1 | 2/1993 |
| GB | 1198713 | 7/1970 |
| JP | 48-39290 | 11/1973 |
| JP | B2 2642163 | 5/1997 |

* cited by examiner

*Primary Examiner*—Christopher P. Schwartz
(74) *Attorney, Agent, or Firm*—Oliff & Berridge, PLC

(57) ABSTRACT

The present invention is directed to a curved helical compression spring having a plurality of coils along a curved coil axis. Each coil constituting the helical compression spring is increased and decreased in diameter, and the order of the increased diameter and the decreased diameter of each coil is reversed at a predetermined position on the longitudinal axis of the helical compression spring, so as to provide the curved coil axis, such as the coil axis curved in C-shape. For example, one section of each coil having approximately a half of the circumference of each coil, which is divided by a plane including the coil axis, is increased in diameter, whereas the other one section of approximately a half of the circumference of each coil is decreased in diameter. The curved helical compression spring may be mounted on a vehicle suspension.

6 Claims, 15 Drawing Sheets

F I G. 1
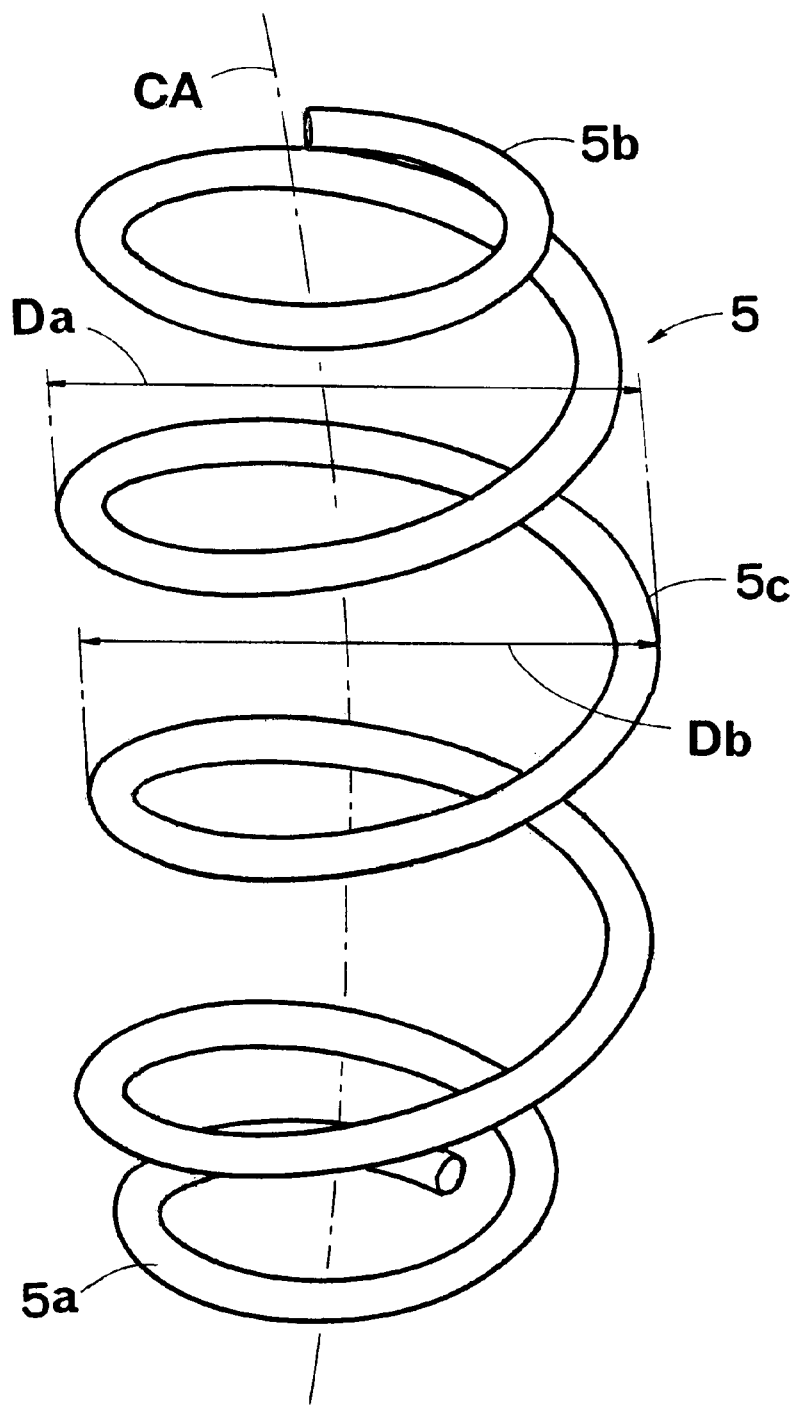

CURVED HELICAL COMPRESSION SPRING

BACKGROUND OF THE INVENTION

1. Field of the Invention

The present invention relates to a curved helical compression spring and a method for producing the same, and more particularly to the curved helical compression spring for use in a strut type vehicle suspension, and to the method for producing the spring.

2. Description of the Related Arts

Various types of helical compression spring have been known heretofore. Among them, is known a compression spring having a coil axis curved in a predetermined direction. In Japanese Utility Model Publication No.48-39290, proposed is a method for forming a coil spring with the center line thereof curved in advance in an unloaded state, and mounting it on the vehicle in such a state that the center line is straightened, to produce a moment by the reactive side force of the spring. Also disclosed in British Patent No.1198713 is a helical spring which is coiled about an arc axis of the unloaded spring, and two support surfaces which extend obliquely at an angle to one another. When the helical spring is fitted between the parallel plates, and the longer surface line of the unloaded helical spring faces the outside of the vehicle, the outer half of the helical spring is compressed to a greater extent than the half which faces the inside of the vehicle.

Furthermore, a wheel suspension having a helical compression spring, the center line of which has an approximately S-shaped course in an unloaded state, has been proposed in Japanese patent No. 2642163, which corresponds to U.S. Pat. No. 4,903,985. The suspension was aimed to enable reduce a side force applied to a piston rod of a shock absorber to a great extent, in view of the fact that because tires are becoming wider and wider, hence shifting the wheel-to-road contact point outward, larger and larger angles between the line of support action and the shock absorber axis arise, so that the helical compression spring can not be positioned as obliquely with respect to the shock absorber axis as would actually be desired. In FIG. 5 of the Japanese patent No. 2642163, there is disclosed a compression spring to be compared with the present invention, the center line of which is curved in an unloaded state, and about which it is stated that the radius of curvature of the spring center line is constant and the center line is curved on only one plane, and that the line of the spring action is merely shifted from the center line of the helical spring, so that it is difficult to reduce the side force sufficiently. In other words, it has been concluded that the helical compression spring with its center line curved in the unloaded state is not to be employed.

In any of the publications as mentioned above, a structure of the helical compression spring having a coil axis formed to be curved in a predetermined direction, i.e., a curved helical spring, has not been disclosed, nor a method for producing the same has been disclosed. If the curved helical spring is produced on the basis of a prior cylindrical type of the helical compression spring, for example, it may be produced by varying the pitch of the spring between the inside and the outside of the curved plane. Therefore, the pitch of the curved helical spring will be varied alternately in dependence upon the number of coils, along the coil axis. However, it is very difficult to produce the compression spring for creating a predetermined side force, holding it in a predetermined curved shape, by varying the pitch of the spring between the inside and the outside of the curved plane. Therefore, it is presumed that the helical compression spring with its center line curved in the unloaded state was not to be employed, and it was proposed to employ the S-shaped center line according to the Japanese patent No. 2642163.

In the mean time, there exists a helical spring that is formed to vary a diameter of each coil along the coil axis, such as a truncated cone-shaped helical spring, a barrel-shaped helical spring, or the like. However, it is hardly assumed to employ the helical spring having the varying diameter of the coil, with its coil axis curved, for the helical compression springs as disclosed in the prior publications. It is natural to be considered that the cylindrical helical compression spring was formed, with the pitches thereof varied between the outside and the inside of the curved plane, because there is no disclosure about such a specific spring that the diameter of the coil is varied along the coil axis, for example, in any of the publications as described above.

SUMMARY OF THE INVENTION

Accordingly, it is an object of the present invention to provide a curved helical compression spring for applying a desired side force to a strut of a vehicle suspension appropriately, when mounted on a vehicle.

And, another object of the present invention is to provide a method for producing the curved helical compression spring easily.

In accomplish the above and other objects, a curved helical compression spring according to the present invention includes a plurality of coils along a curved coil axis. Each coil constituting the helical compression spring is increased and decreased in diameter, and the order of the increased diameter and the decreased diameter of each coil is reversed at a predetermined position on the longitudinal axis of the helical compression spring. Thus, the curved helical compression spring according to the present invention has the curved coil axis, such as the coil axis curved in C-shape.

The helical compression spring may be formed in such a manner that each coil constituting the coils between one end of the helical compression spring and the predetermined position is increased in diameter and then decreased in diameter, and that each coil constituting the coils between the predetermined position and the other one end of the helical compression spring is decreased in diameter and then increased in diameter. More practically, one section of each coil having approximately a half of the circumference of each coil divided by a plane including the coil axis may be increased in diameter, whereas the other one section of approximately a half of the circumference of each coil may be decreased in diameter.

The method for producing a helical compression spring having a plurality of coils along a curved coil axis, may comprise the steps of forming each coil constituting the helical compression spring to be increased and decreased in diameter, and reversing the order of forming each coil to be increased in diameter and decreased in diameter at a predetermined position on the longitudinal axis of the helical compression spring.

In the method as defined above, each coil constituting the coils between one end of the helical compression spring and the predetermined position may be formed to be increased in diameter and then decreased in diameter, and each coil constituting the coils between the predetermined position and the other one end of the helical compression spring may be formed to be decreased in diameter and then increased in diameter.

Preferably, one section of each coil having approximately a half of the circumference of each coil divided by a plane including the coil axis is formed to be increased in diameter, and the other one section having approximately a half of the circumference of each coil the spring is formed to be decreased in diameter.

In the case where an appropriate side force is to be applied, when the curved helical compression spring as constituted above is mounted on a strut-type vehicle suspension, it is necessary to provide a relative relationship between the shape of the curved helical spring in its unloaded state, and an upper seat and/or a lower seat to be mounted thereon, as described hereinafter. In any case, when the curved helical compression spring as constituted above, such as the curved spring having a C-shaped coil axis, is employed, that relationship may be provided easily.

Firstly, the curved helical compression spring is disposed between the upper seat and the lower seat, with the upper seat an/or lower seat tilted by a predetermined angle. For example, the helical compression spring is mounted on the lower seat tilted in the direction for shortening the longitudinal length of the spring at the outside of the curvature of the spring in its unloaded state, and/or it is mounted on the upper seat tilted in the direction for shortening the longitudinal length of the spring at the inside of the curvature of the spring in its unloaded state.

Secondly, the upper seat and the lower seat are held in parallel without being tilted, and the pitch of an upper end coil and/or a lower end coil of the C-shaped curved helical compression coil is set to tilt the end plane of the upper end coil and/or the lower end coil at a predetermined angle against the upper seat or the lower seat to be seated. For example, the pitch of the lower end coil may be set to tilt the end plane of the lower end coil at a predetermined angle against the lower seat to be seated, in the direction for shortening the longitudinal length of the spring at the inside of the curvature, and/or the pitch of the upper end coil may be set to tilt the end plane of the upper end coil at a predetermined angle against the upper seat to be seated, in the direction for shortening the longitudinal length of the spring at the outside of the curvature.

Thirdly, the upper end coil and/or the lower end coil of the C-shaped curved helical compression spring are arranged to be offset. For example, the center of the end plane of the upper end coil may be arranged to be offset to the center of the end plane of the lower end coil in the direction of the inside of the curvature of the spring. Or, the center of the end plane of the lower end coil may be arranged to be offset to the center of the end plane of the upper end coil in the direction of the outside of the curvature of the spring. Accordingly, when the curved helical compression spring is disposed between the upper seat and the lower seat arranged in parallel with each other, can be obtained the same effect as those obtained in the case where the pitch of the upper end coil and/or lower end coil is set to tilt the end plane of the upper end coil and/or lower end coil at a predetermined angle against the upper seat and/or lower seat.

BRIEF DESCRIPTION OF THE DRAWINGS

The above stated object and following description will become readily apparent with reference to the accompanying drawings, wherein like reference numerals denote like elements, and in which:

FIG. 1 is a perspective view of a curved helical spring according to an embodiment of the present invention;

DESCRIPTION OF THE PREFERRED EMBODIMENTS

Referring to FIG. 1, there is schematically illustrated a curved helical compression spring (hereinafter, simply referred to as a curved helical spring). The curved helical spring 5 according to an embodiment of the present invention has a body portion 5c between an upper end coil 5b and a lower end coil 5a, with each coil constituting the body portion 5c increased and decreased in diameter, and with its coil axis CA curved in C-shape. That is, each coil constituting the body portion 5c according to the present embodiment is increased and decreased in diameter, and formed at a substantially constant pitch, and it is so arranged that the order of the increased diameter and the decreased diameter of each coil is reversed at a predetermined position on the longitudinal axis of the curved helical spring 5, to provide the coil axis CA which is curved in a predetermined direction (rightward in FIG. 1) to be formed in C-shape.

Figure 2:
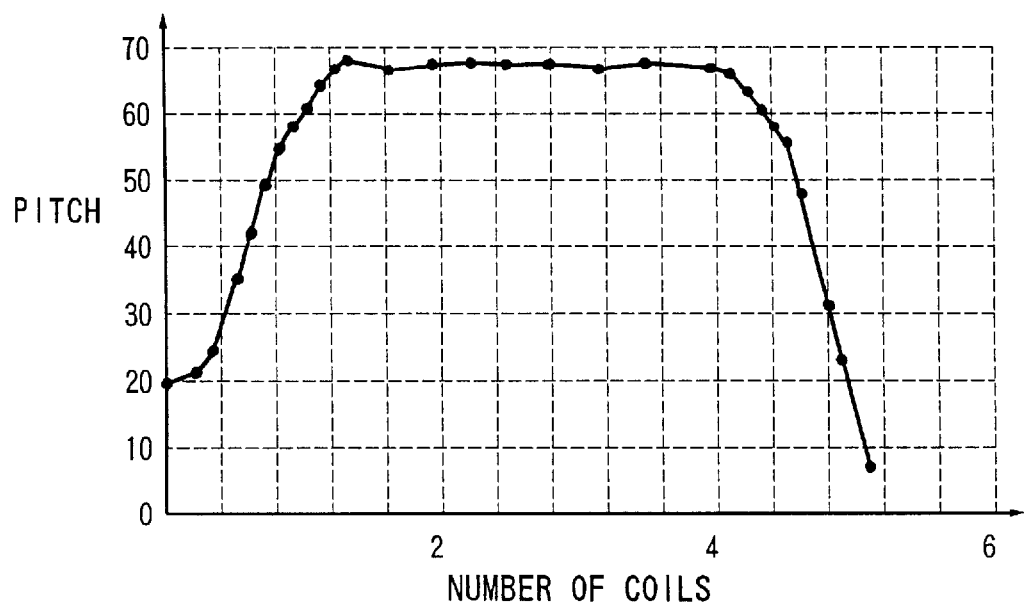
FIG. 2 is a diagram showing a relationship between the number of coils and pitches of a curved helical spring according to an embodiment of the present invention.
Figure 3:
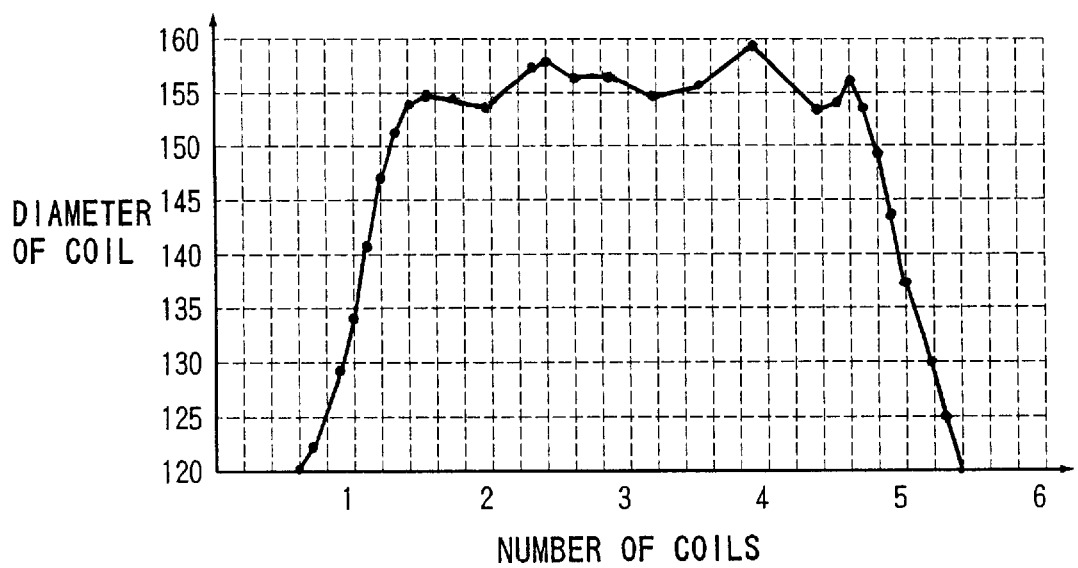
FIG. 3 is a diagram showing a relationship between the number of coils and diameters of coils of a curved helical spring according to an embodiment of the present invention.

Thus, the pitch of the body portion 5c is set to a substantially constant value as shown in FIG. 2, except for the case where a variation of pitch is necessitated so as to avoid any contact between neighboring coils. That is, the variation of pitch is not used for forming the curved coil axis. Furthermore, according to the present embodiment, in order to provide the coil axis CA of the curved helical spring 5 to be curved in C-shape, each coil constituting the body portion 5c is increased and decreased in diameter, and it is so arranged that the order of increasing the diameter and decreasing the diameter in each coil is reversed at a predetermined position on the longitudinal axis of the curved helical spring 5. Therefore, the diameter of each coil is increased and decreased according to the number of coils (i.e., along the longitudinal axis), as shown in FIG. 3.

In practice, the diameter of one coil of the body portion 5c is set in such a manner that one section of the one coil having approximately a half of the circumference of the one coil divided by a plane including the coil axis CA is gradually increased in diameter from its minimum diameter (Db) in the one coil, and reaches its maximum diameter (Da) in the one coil, and the other one section following that one section having approximately a half of the circumference of the one coil is gradually decreased from the maximum diameter (Da) and reaches its minimum diameter (Db) in the one coil. Each coil constituting the coils is varied in diameter at a predetermined position on the longitudinal axis (a target position to be bent, i.e., approximately center of the body portion 5c according to the present invention). That is, each one coil constituting the coils is increased in diameter between the upper end coil 5b and the approximately center of the body portion 5c, and then decreased in diameter between the approximately center of the body portion 5c and the lower end coil 5a.

According to the present embodiment, the upper end coil 5b and the lower end coil 5a are set to be of the same diameter as the portion of the minimum diameter, while they are not limited to that dimension. The maximum diameter (Da) and the minimum diameter (Db) indicate the maximum value and the minimum value in each one coil (or, one turn). According to the present embodiment, they are set to be of different values by one coil according to a target configuration. Thus, the maximum diameter (Da) and the minimum diameter (Db) are set to be of different values in the longitudinal direction (by the number of coils), respectively. The relationship in one coil increased and decreased in diameter is held to be of a predetermined relationship at either side of a predetermined position (the position to be bent) on the longitudinal axis of the spring.

Figure 4:
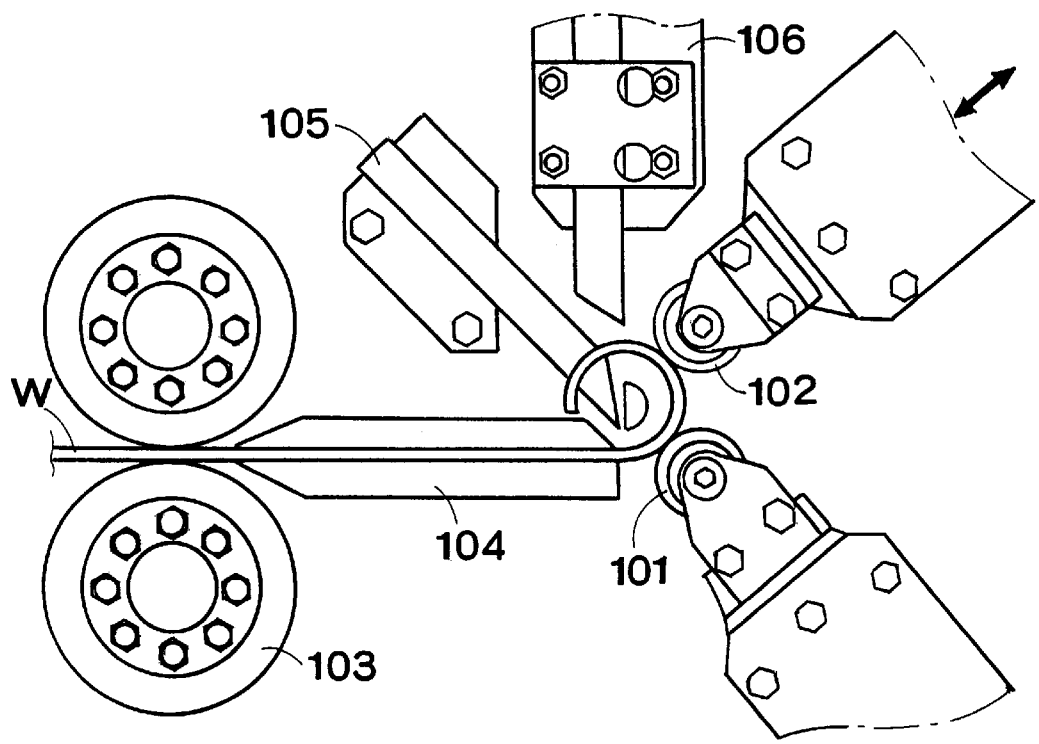
FIG. 4 is a front view of a coiling machine for producing a curved helical spring according to an embodiment of the present invention.

FIG. 4 illustrates a part of a coiling machine for producing the curved helical spring 5 as described above, wherein a basic structure is the same as those distributed in the market. According to the present embodiment, a couple of coiling pins of a first pin 101 and a second pin 102 are provided, and the second pin 102 is adapted to move toward and away from a center of each coil to be formed, as indicated by a two-way arrow, so as to adjust the diameter of the spring. And, the pitch and diameter of the coil as shown in FIGS. 2 and 3 are stored in a program in advance by a numerical control machine (not shown), so that the coiling machine is actuated according to the program. According to a rotation of a feed roller 103, therefore, an element wire of the coil (hereinafter, referred to as wire W) is guided by a wire guide 104 and delivered rightward in FIG. 4. Then, the wire W is bent by the first pin 101, and bent by the second pin 102 to be coiled in a predetermined diameter. During this process, pitches between neighboring coils are controlled to be of a constant value by a pitch tool 105. When the wire W is coiled to provide a predetermined number of coils, it is cut by a cutter 106. Although the first and second pins 101, 102 are employed in the present embodiment, a single coiling pin may be employed.

Figure 5:
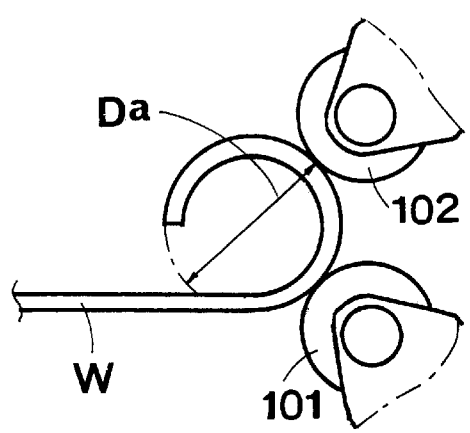
FIG. 5 is a front view showing one process for producing a curved helical spring according to an embodiment of the present invention.
Figure 6:
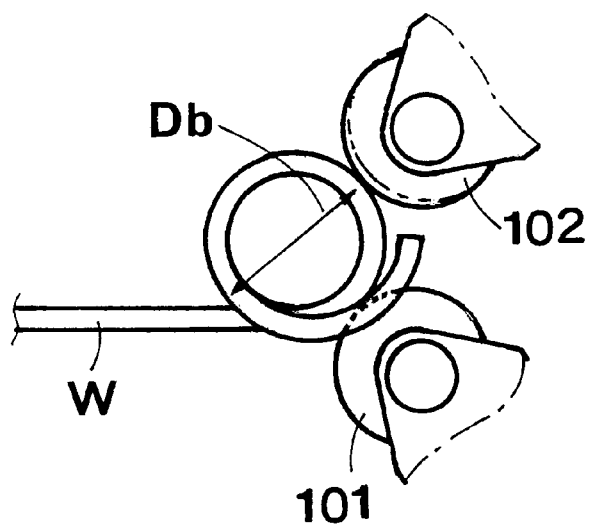
FIG. 6 is a front view showing another process for producing a curved helical spring according to an embodiment of the present invention.

When the curved helical spring 5 is produced by the coiling machine as described above, the first and second pins 101 and 102 are actuated as follows. At the outset, it is so arranged that the diameter of a section extending from [a reference position−½ of one coil] to [the reference position], wherein the reference position of each coil is placed in a bending side (extending side) of the curved helical spring to be formed, i.e., the diameter of one section of each coil having approximately a half of the circumference of each coil divided by a plane including the coil axis (i.e., the plane including the reference position, and perpendicular to a drawing plane of FIG. 4) is increased in diameter. In this case, the wire W is bent by the first and second pins 101 and 102, with the second pin 102 being retracted, and formed to gradually increase the diameter of the coil up to the maximum diameter (Da) as shown in FIG. 5. Then, it is so arranged that the diameter of a section following the above-described section having approximately a half of the circumference of each coil, i.e., the diameter of a section extending from [the reference position] to [the reference position+½ of one coil] is decreased in diameter. In this case, the wire W is bent, with the second pin 102 being advanced, and formed to gradually decrease the diameter of the coil down to the minimum diameter (Db) as shown in FIG. 6.

Likewise, the next section of approximately a half of the circumference of the coil is bent, with the second pin 102 being retracted, until it becomes to be of the maximum diameter (Da). And, the following section of approximately a half of the circumference of the coil is bent, with the second pin 102 being advanced, until it becomes to be of the minimum diameter (Db). If the order of increasing and decreasing the diameter of each coil is reversed at a predetermined position (bent position) on the longitudinal axis of the spring, e.g., at the approximate center of the longitudinal axis of body portion 5c to be formed, and the increasing and decreasing the diameter of each coil are repeated, then the diameter of the coil is formed to be varied as follows. That is, the diameter of one coil from the upper end coil 5b to the approximate center of the body portion 5c is first increased then decreased, and thereafter the diameter of one coil from the approximate center of the body portion 5c to the lower end coil 5a is first decreased then increased. Accordingly, if the diameter of the coil is set as shown in FIG. 3 for example, and the coiling is made by the advancing movement and retracting movement of the second pin 102 repeated alternately, by each approximately half portion of the circumference of the coil, then the curved helical spring having the curved coil axis, such as the coil CA axis curved in C-shape as shown in FIG. 1, will be formed.

Figure 7:
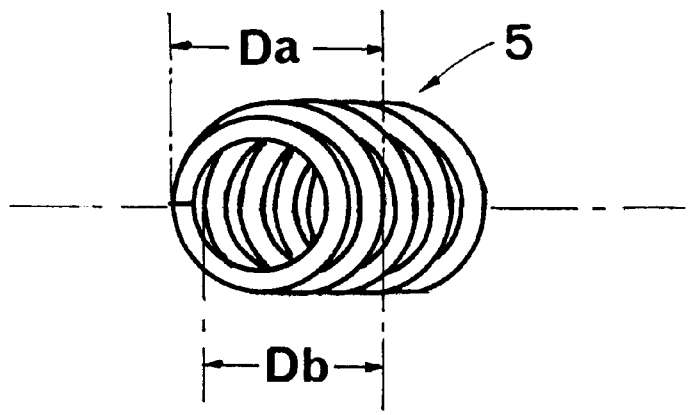
FIG. 7 is a plan view showing an example of a part of a curved helical spring under a coiling process in one process for producing the curved helical spring according to an embodiment of the present invention.

The diameter of the coil may be set to provide the maximum diameter (Da) and the minimum diameter (Db) every approximately half portion of the circumference of the coil, and the diameters Da and Db may be of a constant value along the longitudinal axis. In this case, however, there is caused a difference between the configuration of the outer surfaces of the one side and the configuration of the outer surfaces of the other one side, which are divided by a plane including the coil axis CA. As a result, the spring is formed to extend rightward in FIG. 7, thereby to provide a coil axis having a sharp bent portion, so that the coil axis does not become smooth, while it constitutes approximately C-shaped.

Figure 8:
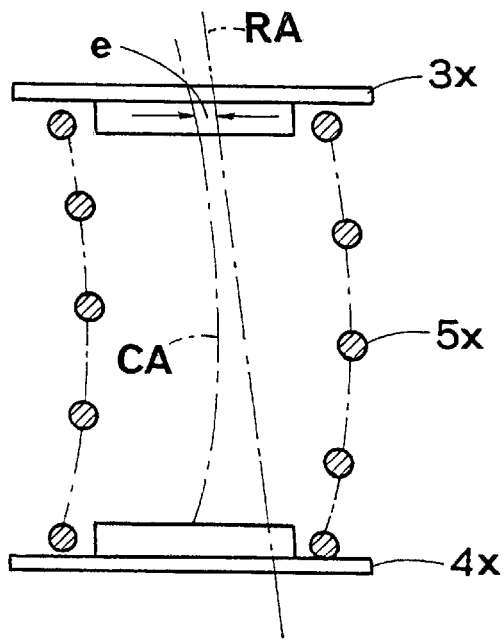
FIG. 8 is a sectional view of one example of a curved helical spring, which is disposed between an upper seat and a lower seat arranged in parallel with each other, according to an embodiment of the present invention.
Figure 9:
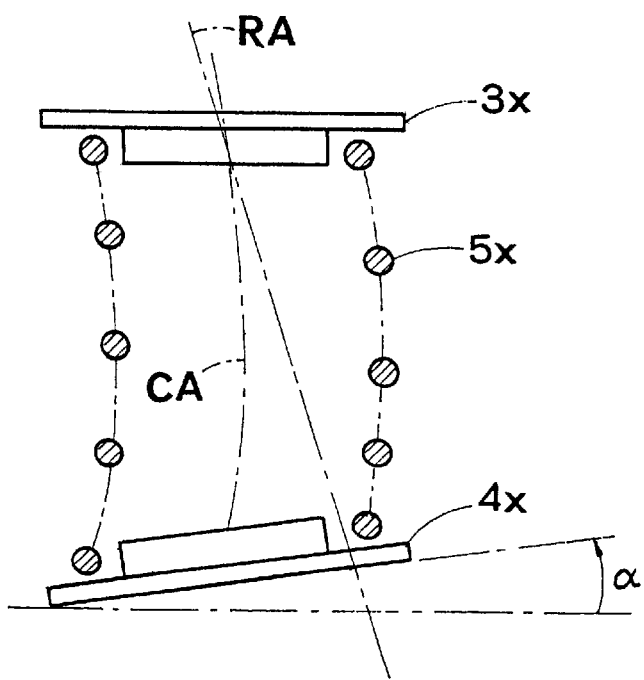
FIG. 9 is a sectional view of one example of a curved helical spring, which is disposed between an upper seat and a tilted lower seat, according to an embodiment of the present invention.

Next will be explained an embodiment of the curved helical spring 5 as constituted above, which is used for a compression spring for use in a strut type suspension. In this case, if the curved helical spring 5 is simply installed between the upper seat 3 and the lower seat 4 mounted in parallel with each other as shown in FIG. 8, the reaction force axis RA will be shifted parallel as shown by oen-dot chain line in FIG. 8, so that the point of application of the reaction force will be displaced from the coil axis CA by a displacement (e). According to the present embodiment, therefore, the curved helical spring 5 is compressed, with the lower plate 4 tilted by the tilting angle $\alpha$ counterclockwise as shown in FIG. 9, for example. Consequently, the angle of the reaction force axis RA is changed as shown in FIG. 9, so that the point of application of the reaction force is positioned approximately on the center of the upper end plane, and it is positioned on the coil axis CA, as will be described in detail as follows.

Figure 10:
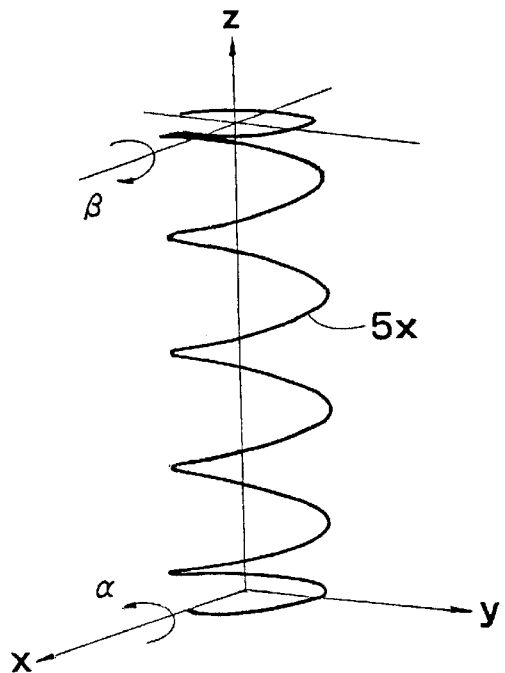
FIG. 10 is a perspective view showing a model of helical compression spring for experimenting a curved helical spring to investigate influence on spring reaction force by tilting a lower end plane to an upper end plane of the spring.

FIG. 10 illustrates a model of a helical compression spring 5x, which is used for experimenting the helical compression spring with the initial curvature, the coil axis of which passes the center of the upper end plane and curves in approximate C-shape in an unloaded state, to investigate the influence on the spring reaction force by tilting the upper seat and/or the lower seat. Hereinafter, will be described results of the experiments in the case where the helical spring 5x is compressed to shorten the longitudinal length of either side of the helical spring 5x, i.e., the lower end plane of the helical spring 5x is rotated about the x-axis counterclockwise by $\alpha$ degree as shown in FIG. 10, and the case where the upper end plane of the helical spring 5x is rotated about the x-axis clockwise by $\beta$ degree.

Figure 11:
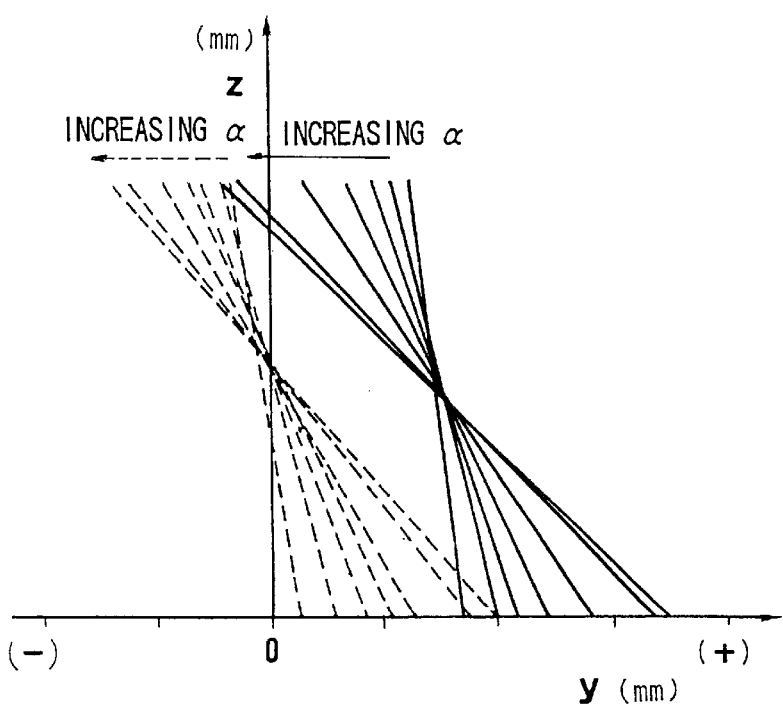
FIG. 11 is a diagram showing a variation of the reaction force axis of the helical spring as shown in FIG. 10 in the case where the lower end plane is rotated about the x-axis counterclockwise with the helical spring compressed to a predetermined height.

In FIG. 11 which shows the result obtained from the experiment, solid lines indicate variation of the reaction force axis of the helical spring 5x, in the case where the lower end plane is rotated about the x-axis counterclockwise, with the helical spring 5x compressed to a predetermined height, and broken lines indicate variation of the reaction force axis of the conventional helical compression spring in the same case as the former case. When a rotational angle which is rotated about the x-axis in FIG. 10, i.e., tilting angle $\alpha$ of the lower end plane, is increased, the upper end of the reaction force axis will move as indicated by the arrow. In FIG. 11, the arrow indicates the direction to which the tilting angle $\alpha$ increases. The reaction force axis lies on the line for connecting the points of application of the reaction forces acting on the upper end plane and lower end plane.

As shown in FIG. 11, the following results are obtained from the experiment.

(1) By initially curving the helical spring, the reaction force axis of the spring is displaced parallel in the y-direction, i.e., in the direction to which the spring is initially curved to extend.

(2) With increase of the tilting angle $\alpha$ in the counter-clockwise direction in FIG. 10, the inclination of the reaction force axis of the spring in the y-direction increases. In other words, the reactive side force of the helical compression spring increases, with increase of the tilting angle $\alpha$ of the lower end plane.

(3) With increase of the tilting angle $\alpha$ of the lower end plane, the point of application of the reaction force on the upper end plane of the helical spring 5x gets close to the center of the upper end plane, i.e., z-axis in FIG. 11, as indicated by the solid lines, whereas the conventional spring gets away from the center of the upper end plane as indicated by the broken lines.

In the case where the upper end plane of the helical spring 5x is rotated clockwise about the x-axis, with the helical spring 5x compressed to the predetermined height, the inclination of the reaction force axis of the spring in the y-direction decreases, i.e., the reactive side force of the helical spring 5x decreases, with increase of the tilting angle $\beta$ of the upper end plane in the clockwise direction (Figure showing this relationship is omitted).

Figure 12:
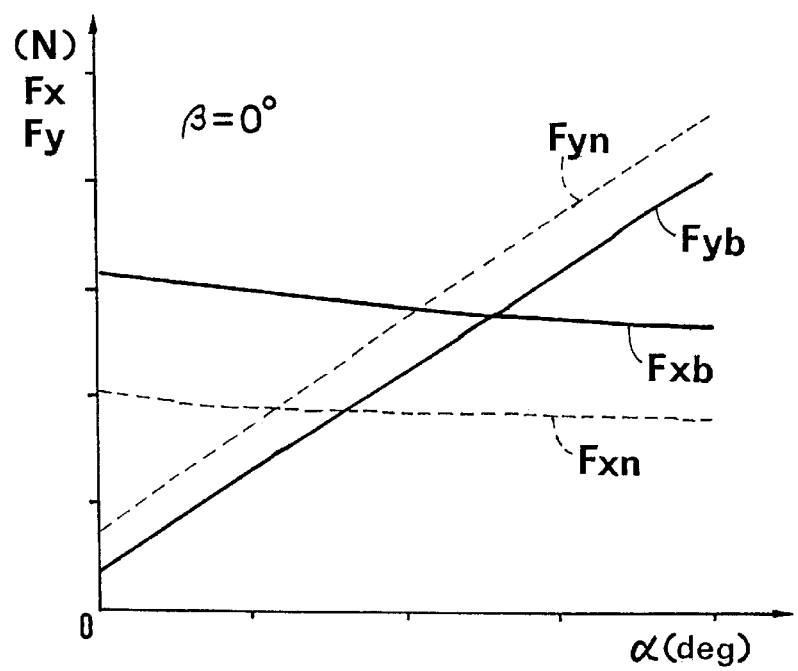
FIG. 12 is a diagram showing a variation of reactive side force of the helical spring as shown in FIG. 10 in the case where the lower end plane is rotated about the x-axis counterclockwise with the helical spring compressed to a predetermined height.

Therefore, in the case where the tilting angle of the upper end plane of the helical spring 5x is zero, with the helical spring 5x compressed to the predetermined height, when the lower end plane is rotated about the x-axis counterclockwise in FIG. 10 by the tilting angle $\alpha$, the reactive side force will be varied as indicated by the solid lines in FIG. 12. The abscissa in FIG. 12 represents the tilting angle $\alpha$ of the lower end plane, and the ordinate represents the reactive side forces Fx, Fy in the x-direction and the y-direction, respectively. Solid lines indicate variations of the reactive side forces Fxb, Fyb of the curved helical spring 5 according to the present embodiment, whereas the broken lines indicate the variation of the reactive side forces Fxn, Fyn according to the conventional helical compression spring.

As shown in FIG. 12, the following results are obtained.

(1) If the helical spring 5x is initially curved in the y-direction, the reactive side force Fxb in the x-direction is increased, whereas the reactive side force Fyb in the y-direction is decreased, comparing with the reactive side forces Fxn, Fyn of the conventional helical compression spring.

(2) In the case where the lower end plane is rotated about the x-axis counterclockwise in FIG. 10 by the tilting angle α, the reactive side force Fyb in the y-direction is largely increased, with increase of the tilting angle α, whereas the reactive side force Fxb in the x-direction is slightly reduced.

(3) The absolute value of the reactive side force Fxb in the x-direction is not negligible, in order to have the reaction force axis of the spring coincide with an ideal offset line. In this respect, the reactive side force Fxb in the x-direction can be minimized by coinciding the curving direction of the spring with the direction of the reactive side force exerted when the spring is compressed between parallel seats, to adjust the position of end turn of the spring.

Figure 13:
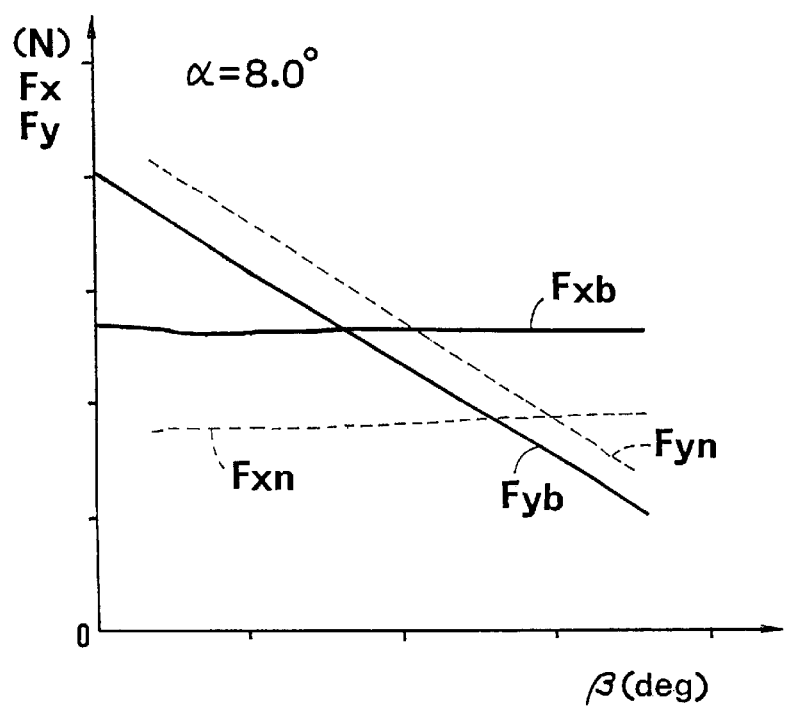
FIG. 13 is a diagram showing a variation of reactive side force of the helical spring as shown in FIG. 10 in the case where the lower end plane is rotated about the x-axis counterclockwise and the upper end plane is rotated about the x-axis clockwise with the helical spring compressed to a predetermined height.

On the contrary, in the case where the lower end plane of the helical spring 5x is rotated about the x-axis counterclockwise in FIG. 10 by the tilting angle α of 8.0 degree, with the helical spring 5x compressed to the predetermined height, and at the same time the upper end plane of the helical spring 5x is rotated about the x-axis clockwise in FIG. 10, the reactive side forces Fxb, Fyb of the helical spring 5x will vary as indicated by the solid lines in FIG. 13, with increase of the tilting angle β of the upper end plane. The broken lines indicate the variation of the reactive side forces in the same case as the above case. Thus, referring to FIG. 13, it can be concluded that with increase of the tilting angle β of the upper end plane in the clockwise direction, the reactive side forces Fyb, Fyn in the y-direction are largely decreased, and the reactive side forces Fxb, Fxn are slightly increased.

In conclusion, according to the initially curved helical compression spring, (1) The reaction force axis is shifted parallel in the extending direction of the curved spring.

(2) When the lower end plane is tilted about the x-axis counterclockwise in FIG. 10, the reactive side force in the y-direction is largely increased, and the angle between the coil axis and the reaction force axis of the spring is increased.

(3) In the case where the lower end plane is rotated about the x-axis counterclockwise in FIG. 10 by the tilting angle α, the point of application of the reaction force on the upper end plane gets close to the center of the upper end plane, with increase of the tilting angle α.

(4) If the upper end plane is rotated about the x-axis clockwise in FIG. 10 by the tilting angle β, however, the reactive side force in the y-direction is largely decreased, with increase of the tilting angle β, to compensate the effect obtained when the lower end plane was tilted.

(5) Although the reactive side force in the direction vertical to the extending direction of the curved spring (i.e., the reactive side force in the x-direction) is large in value, it can be reduced as described before, and its variation caused by tilting the end plane will be as small as negligible.

Figure 14:
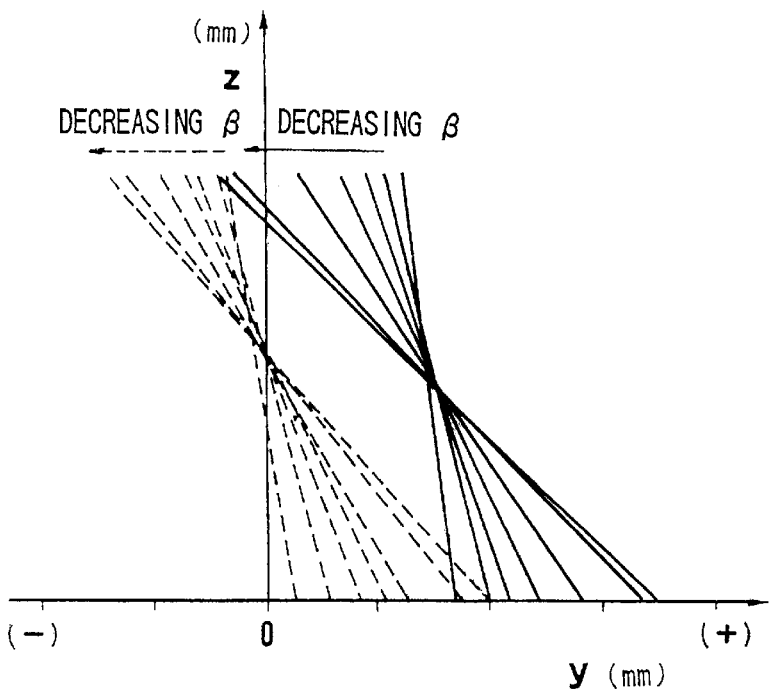
FIG. 14 is a diagram showing a variation of the reaction force axis of the helical spring as shown in FIG. 10 in the case where the upper end plane is rotated about the x-axis counterclockwise with the helical spring compressed to a predetermined height.

In FIG. 14, solid lines indicate variation of the reaction force axis of the helical spring 5x, in the case where the upper end plane is rotated about the x-axis counterclockwise with the helical spring 5x compressed to the predetermined height, i.e., a reverse direction to the direction indicated by the arrow in FIG. 10. Since the direction of the arrow in FIG. 10 corresponds to the direction for increasing the angle β, the reverse direction corresponds to the direction for decreasing the angle β. And, the broken lines indicate variation of the reaction force axis of the conventional helical compression spring in the same case as the former case. FIG. 14 shows the variation of the reaction force axis of the spring, when a rotational angle which is rotated about the x-axis in FIG. 14, i.e., tilting angle β of the upper end plane, is increased in the direction opposite to the direction as indicated by the arrow in FIG. 10 (in other words, the decreasing direction of the angle β). By increasing the tilting angle β of the upper end plane in the direction opposite to the clockwise direction as indicated by the arrow in FIG. 10, i.e., counterclockwise direction, the inclination of the upper end plane in the y-direction will be increased. In other words, the reactive side force of the curved helical spring 5 is increased, with decrease of the tilting angle β of the upper end plane in the clockwise direction as indicated by the arrow in FIG. 10.

Figure 15:
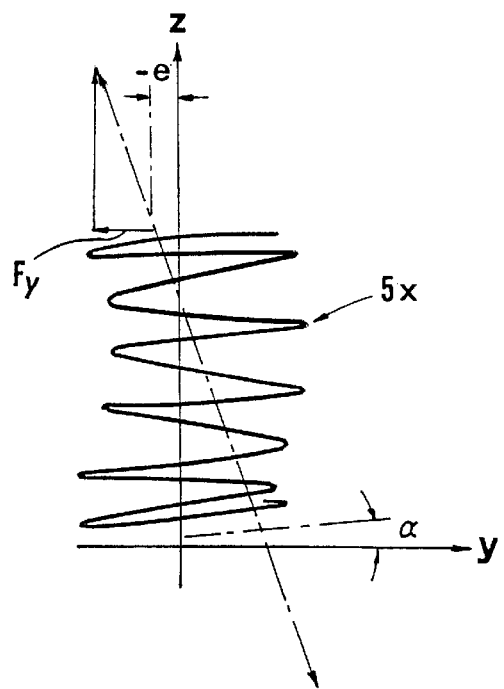
FIG. 15 is a characteristic diagram showing a relationship of reaction force in the case where the lower end plane of the helical spring as shown in FIG. 10 is rotated about the x-axis counterclockwise with the helical spring compressed to a predetermined height.
Figure 16:
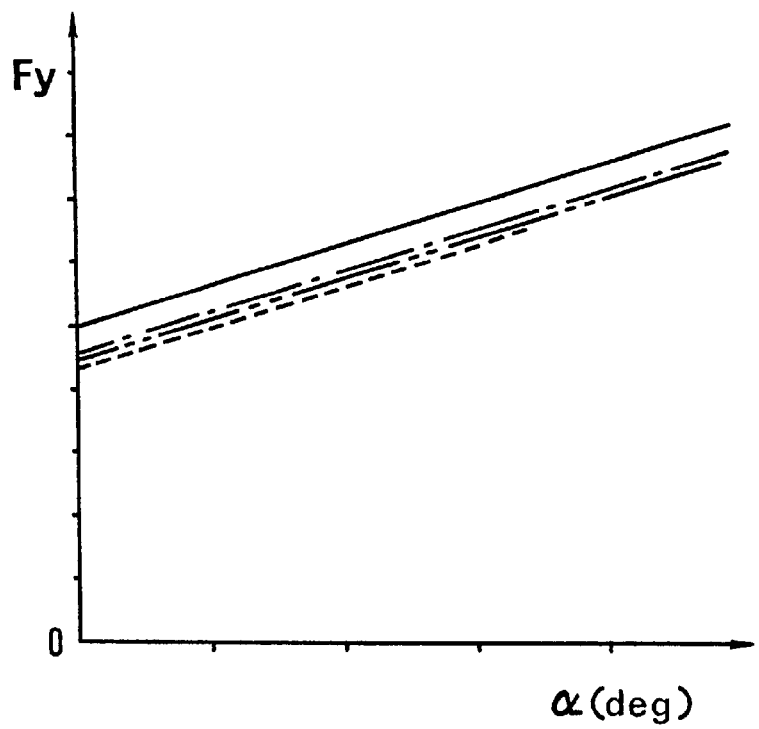
FIG. 16 is a diagram showing a variation of the reactive side force of the helical spring as shown in FIG. 10 according to a tilting angle α of the lower plane, in the case where the lower end plane is rotated about the x-axis counterclockwise with the helical spring compressed to a predetermined height.
Figure 17:
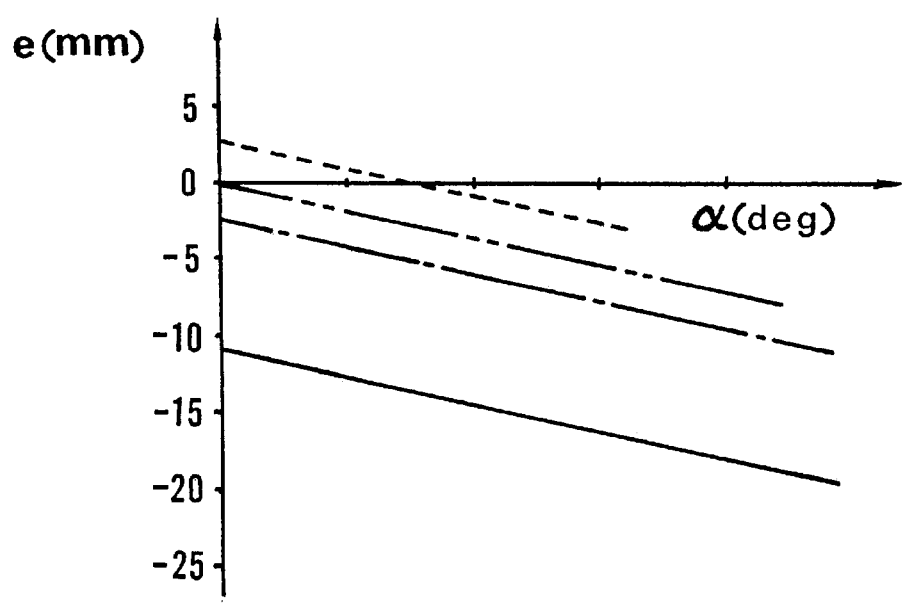
FIG. 17 is a diagram showing a displacement of the point of application of reaction force caused according to a variation of a tilting angle α of the lower plane of the helical spring as shown in FIG. 10, in the case where the lower end plane is rotated about the x-axis counterclockwise with the helical spring compressed to a predetermined height.

Referring to FIGS. 15–17, it can be concluded that by tilting the lower end plane of the helical spring 5x with the initial curvature as shown in FIG. 10, the reaction force axis RA will pass approximately the center of the upper end plane. FIG. 15 illustrates a state of forces exerted in the case where the lower end plane of the helical spring 5x as shown in FIG. 10 is rotated about the x-axis counterclockwise in FIG. 10, with the helical spring 5x compressed to the predetermined height. As can be seen in FIGS. 16 and 17, the reactive side force Fy and the displacement (e) of the point of application of force will vary according to the tilting angle α of the lower end plane of the helical spring 5x to the lower seat (not shown in FIG. 15).

FIGS. 16 and 17 show the results obtained from the experiment, wherein solid lines indicate the result of the experiment for a helical compression spring without being curved, one-dot chain lines indicate the result for a helical compression spring which was curved by 10 mm of the curved amount (d), two-dot chain lines indicate the result for a helical compression spring which was curved by 13 mm, and broken lines indicate the result for a helical compression spring which was curved by 16 mm. As can be seen from the results of those experiments, with increase of the radius of curvature, the reactive side force Fy is decreased, and the point of application of reaction force on the upper end plane is sifted in the extending direction of the curvature. And, in the case where the lower end plane is tilted by the tilting angle α, with increase of the angle α, the reactive side force Fy is increased, and the point of application of force on the upper end plane is sifted in the direction opposite to the extending direction of the curvature of the helical spring.

Figure 18:
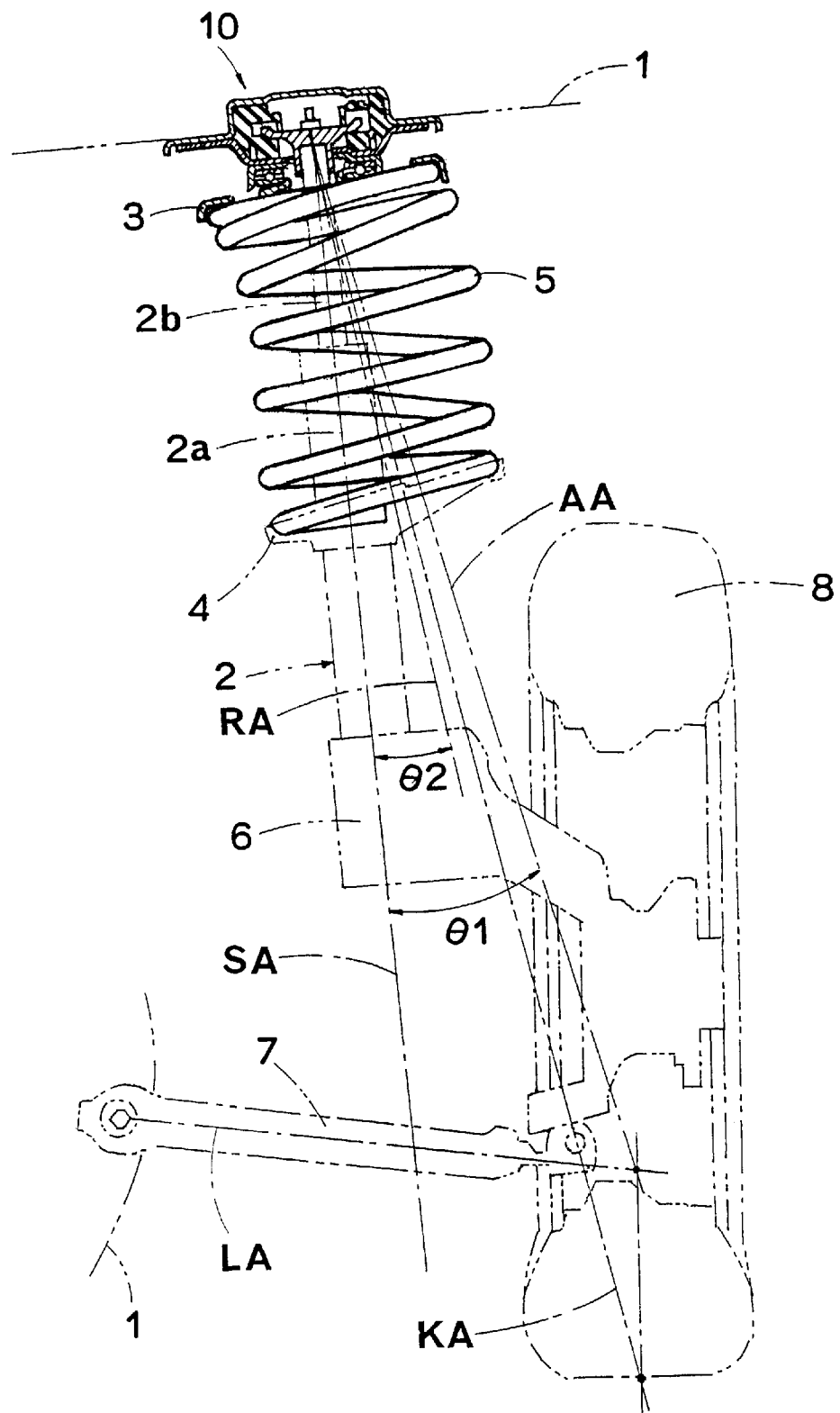
FIG. 18 is a front view of a curved helical spring of an embodiment of the present invention mounted on a vehicle suspension.

FIG. 18 illustrates a first embodiment of the curved helical spring 5 for use in a strut type suspension (hereinafter, simply referred to as suspension). As shown in FIG. 18, the curved helical spring 5 as shown in FIG. 1 is mounted on the suspension, most parts of which are illustrated by two-dot chain lines except for a portion for supporting the upper end of the curved helical spring 5. A strut 2 is elastically mounted at its upper end on a vehicle body 1, and the upper seat 3 is mounted on the vehicle body 1. The lower seat 4 is fixed to a middle portion of the strut 2. Between the upper seat 3 and the lower seat 4, the curved helical spring 5 is arranged to encircle therein the strut 2. The lower end of the strut 2 is fixed to a knuckle 6, which is pivotally mounted on the vehicle body 1 through a lower arm 7. Accordingly, a wheel 8 is mounted on the knuckle 6, which is connected to the vehicle body 1 through the strut 2 and the curved helical spring 5, and which is connected to the vehicle body 1 through the lower arm 7. The upper end of the strut 2 and the upper seat 3 are mounted on the vehicle body 1 thorough a strut mount 10, explanation of which is omitted. The strut 2 is provided with a cylinder 2a and a rod 2b which is slidably mounted in the cylinder 2a, to form a shock absorber. The rod 2b is mounted at its upper end on the vehicle body 1 through the strut mount 10, and the cylinder 2a is fixed at its lower end to the knuckle 6, to form a structure similar to that disclosed in the aforementioned Japanese Utility Model No. 48-39290.

As shown in FIG. 18, the lower seat 4 of the present embodiment is fixed to the cylinder 2a of the strut 2 so as to be tilted at the predetermined angle α in the direction for shortening the longitudinal length of the curved helical spring 5 at the outside of the vehicle body. In the case where the curved helical spring 5 is arranged to be offset to the strut 2, as shown in FIG. 18, the lower seat 4 is supported to be tilted at the predetermined angle α in the direction for shortening the longitudinal length of the curved helical spring 5 at the outside of the vehicle body toward the offset direction (rightward in FIG. 18).

According to the suspension as shown in FIG. 18, the reaction force axis RA does not coincide with the load input axis AA. That is, the strut axis SA of the strut 2 and the load input axis AA form an angle θ1, whereas the strut axis SA and the reaction force axis RA form an angle θ2. In FIG. 18, "LA" designates the axis of the lower arm 7, "KA" designates the axis of a king pin (not shown). Due to the relationship between the reaction force axis RA and the strut axis SA which do not coincide with each other, sliding resistance may be caused between the cylinder 2a and the rod 2b of the strut 2. However, the sliding resistance will be prevented, by the side force of the curved helical spring 5, from being created, thereby to ensure a smooth sliding motion of the rod 2b.

Figure 19:
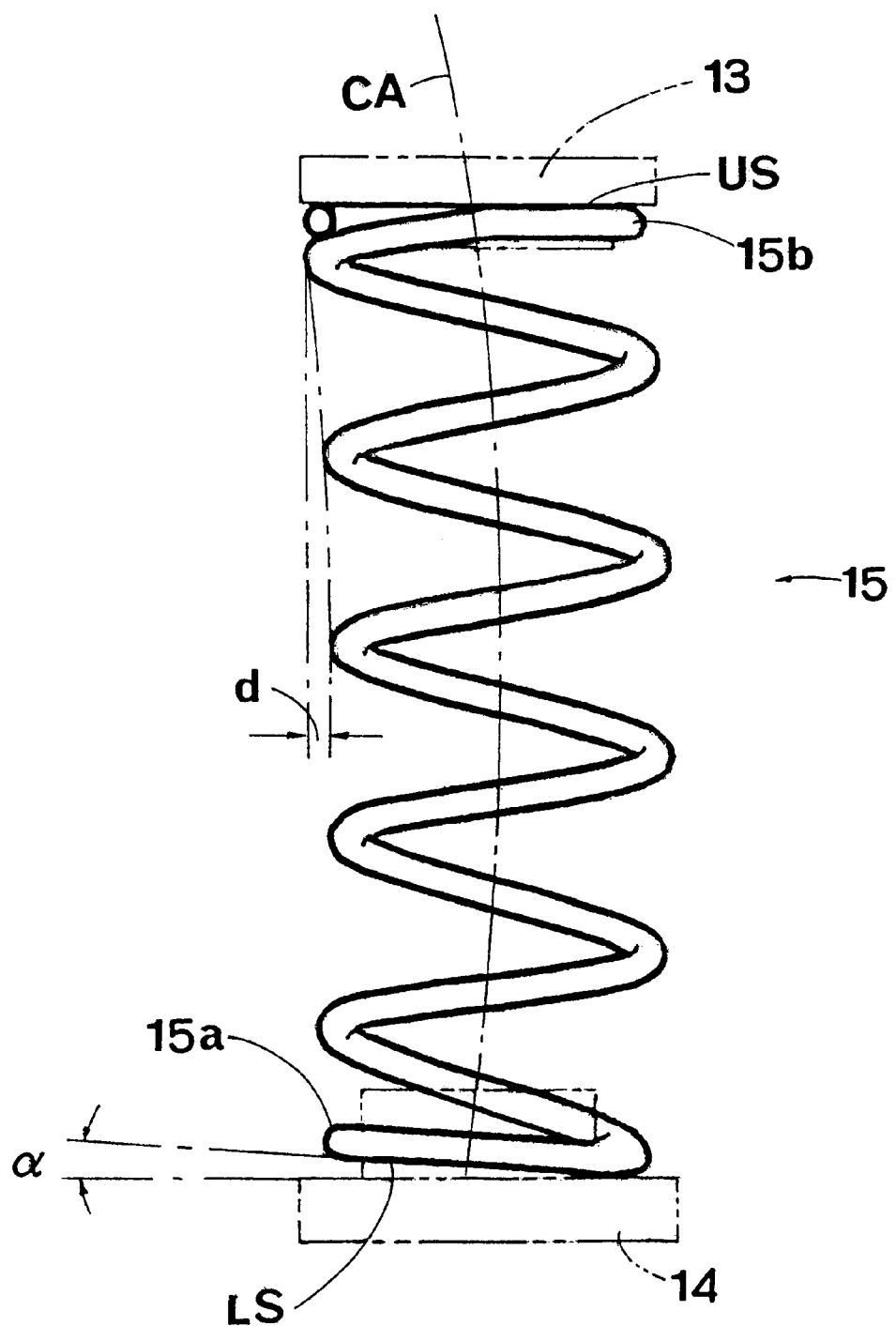
FIG. 19 is a sectional view of a curved helical spring according to another embodiment of the present invention.

FIG. 19 illustrates a second embodiment of the curved helical spring mounted on the suspension, wherein a curved helical spring 15 has an initial curvature of curved amount (d), and a pitch of a lower end coil 15a of the curved helical spring 15 has been set to tilt the end plane of the lower end coil 15a at a predetermined angle α to the lower seat 14 on which the lower end coil 15a is seated in its unloaded state, in the direction for shortening the longitudinal length of the curved helical spring 15 at the inside of the curvature (i.e., left side in FIG. 19). In FIG. 19, the upper seat 13 and lower seat 14 on which the curved helical spring 15 is seated are indicated by two-dot chain line, a seat plane of the upper end coil 15b which abuts the upper seat 13, i.e., the upper end plane is indicated by (US), and a seat plane of the lower end coil 15a which abuts the lower seat 14, i.e., the lower end plane is indicated by (LS).

In other words, according to the present embodiment, the curved amount (d) and the pitch of the lower end coil 15a for providing the tilting angle α (i.e., the rotational angle rotating clockwise in FIG. 19) are set, so as to be in the same state as that the lower seat is rotated counterclockwise by the tilting angle α, with the helical spring 5x as shown in FIG. 10 compressed to the predetermined height, when the curved helical spring 15 is mounted between the upper seat 13 and the lower seat 14 as shown in FIG. 19. Accordingly, if the curved helical spring 15 formed as shown in FIG. 19 is mounted between the upper seat 13 and the lower seat 14 which are arranged in parallel with each other in the same manner as in the prior art, and the curved helical spring 15 is installed so that the extending direction of the curve of the coil axis CA directed to the outside of the vehicle body, the same effect as in the case where the helical spring 5x in FIG. 10 is tilted to the lower seat, as shown in FIG. 9, can be obtained.

Or, the pitch of the upper end coil 15b of the curved helical spring may be set to tilt the end plane of the upper end coil 15b at the predetermined angle β to the upper seat 13 to be seated, in the direction for shortening the longitudinal length of the helical spring at the outside of the curvature (i.e., right side in FIG. 19). That is, in view of the property as shown in FIG. 14, the curved amount (d) and the pitch of the upper end coil 15b for providing the tilting angle β in an unloaded state may be set, so as to be in the same state as that the upper end plane US is rotated counterclockwise by the tilting angle β, with the helical spring 5x in FIG. 10 compressed to the predetermined height.

The helical spring may be formed such that the tilting angles γ, δ of the lower end plane LS and upper end plane US, and the pitches of the upper end coil 15b and lower end coil 15a are set, so as to be in the same state, when the helical spring is mounted between the upper seat and the lower seat which were arranged in parallel with each other (not shown), the lower end plane of the helical spring 5x as shown in FIG. 10 is rotated about the x-axis counterclockwise by the angle γ, and also the upper end plane of the helical spring 5x is rotated about the x-axis counterclockwise by the angle δ, with the helical spring 5x compressed to the predetermined height. Accordingly, when the curved helical spring 15 is mounted between the upper seat and the lower seat which were arranged in parallel with each other, the same effects as those in the embodiment as disclosed in FIG. 19 can be obtained.

Figure 20:
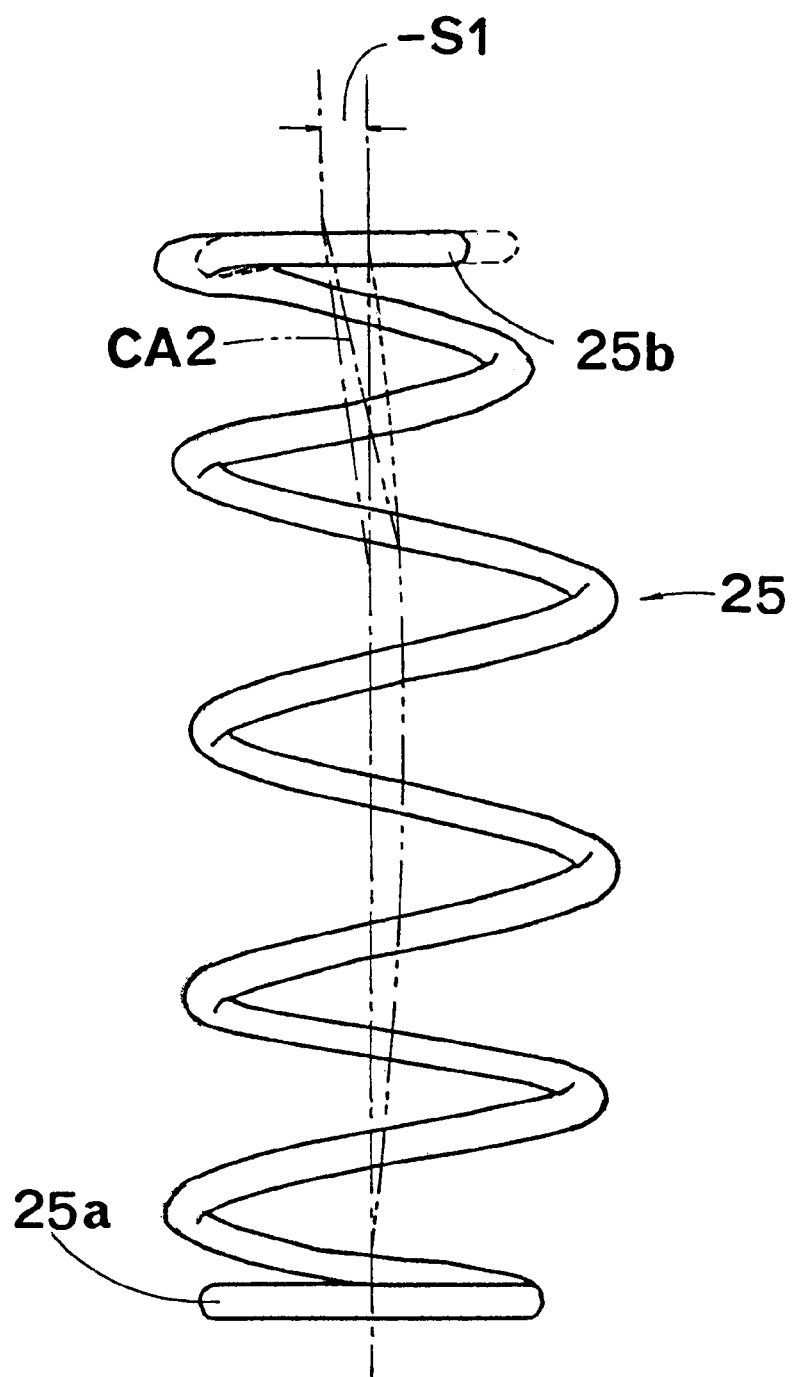
FIG. 20 is a front view of a curved helical spring according to a further embodiment of the present invention.
Figure 21:
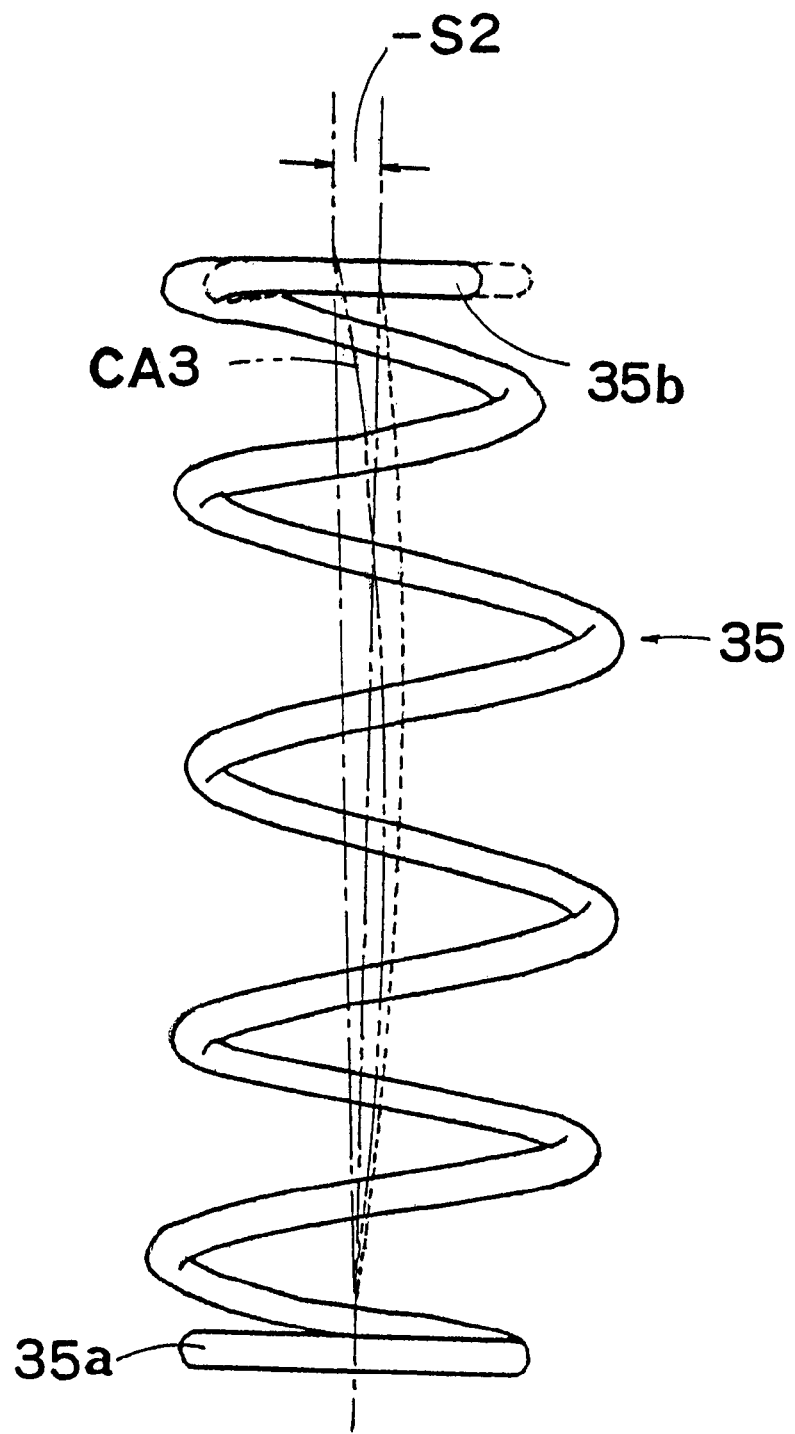
FIG. 21 is a front view of a curved helical spring according to a yet further embodiment of the present invention.

Referring to FIGS. 20 and 21, will be explained a third embodiment of the present invention, wherein curved helical compression springs 25, 35 as shown in FIGS. 20 and 21 are formed so that the coil axes CA2, CA3 are curved at their unloaded states, respectively, in such a manner that the center of the upper end coil 25b and the center of the upper end coil 35b are offset to the center of the lower end coil 25a and the center of the lower end coil 35a, in the direction of the inside of the curvature (left side in FIGS. 20, 21), by the horizontal distances S1, S2, respectively. Likewise, the coil axes may be set, in such a manner that the center of the lower end coil is offset to the center of the upper end coil in the direction of the outside of the curvature (rightward in FIGS. 20, 21). When the curved helical spring 25 or 35 as shown in FIGS. 20 and 21 is mounted between the upper seat 13 and the lower seat 14, the center of the end plane of the upper end coil 25b or 35b, which is offset by the distance S1 or S2 to the center of the end plane of the lower end coil 25a or 35a, respectively, will coincide with the center of the upper seat 13 which is not offset to the center of the lower seat 14. As a result, the curved helical spring 25 or 35 is held in the same state that the upper end plane of the upper end coil 25b or 35b is rotated counterclockwise by the angle δ, so that substantially the same effect as the effect obtained by using the helical spring with the pitch of its upper end coil adjusted.

Figure 22:
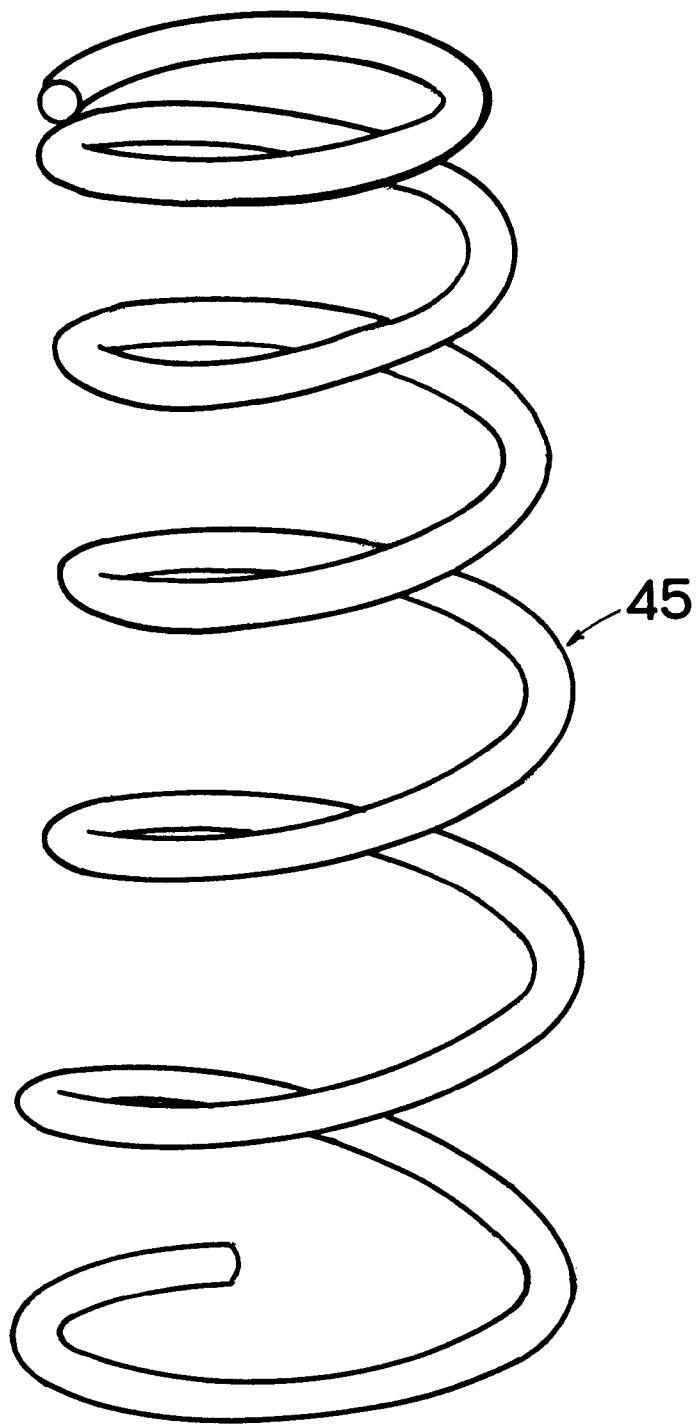
FIG. 22 is a perspective view of a curved helical spring according to a yet further embodiment of the present invention.
Figure 23:
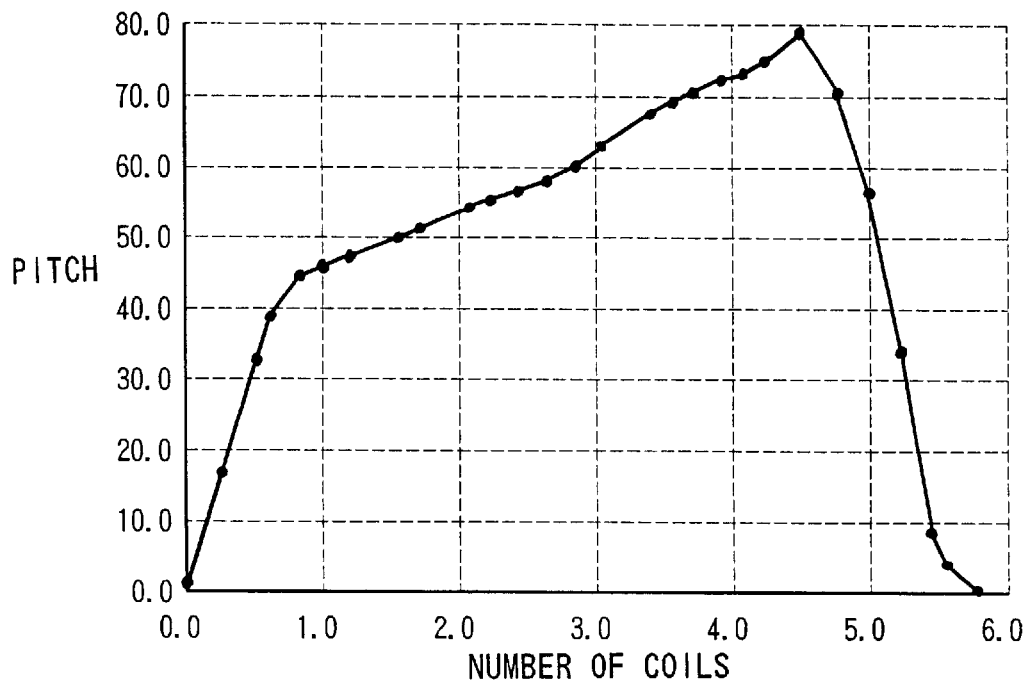
FIG. 23 is a diagram showing a relationship between the number of coils and pitches of the curved helical spring as shown in FIG. 22.
Figure 24:
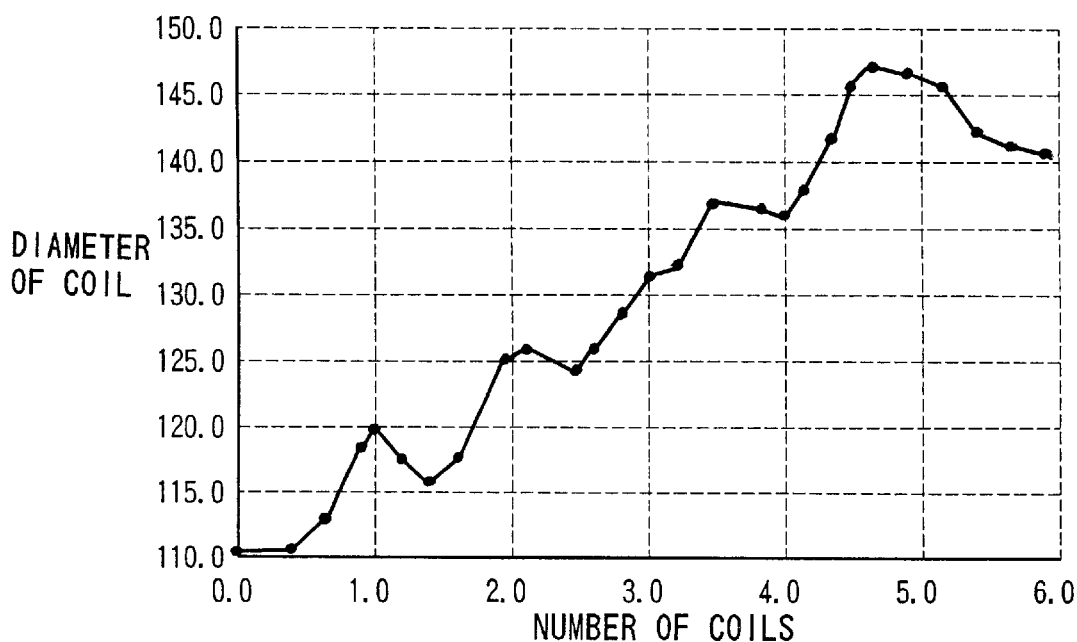
FIG. 24 is a diagram showing a relationship between the number of coils and diameters of coils of the curved helical spring as shown in FIG. 22.

Next, FIG. 22 illustrates a curved helical spring 45 according to a yet further embodiment of the present invention, wherein the curved helical spring 45 is formed in a truncated cone-shape with a curved coil axis. According to the curved helical spring 45, the pitch is provided so as to be increased in proportion to the number of coils, as shown in FIG. 23. However, the variation of the pitch is caused by forming the configuration of the spring to be the conical shape with a curved coil axis, so that it is provided as an independent condition, without any relationship with forming the coil axis to be curved. Also, FIG. 24 shows a graph in which the diameter of the coil is increased in proportion to the number of coils, this variation is also caused by forming the configuration of the spring to be the truncated cone-shape, so that it is provided without any direct relationship with forming the coil axis to be curved. In order to curve the coil axis, however, the diameter of the coil is gradually increased along the longitudinal axis, maintaining a relative relationship between the diameters of the approximately halves of circumferences in one coil. In the case where the spring is formed to provide a specific configuration as shown in the curved helical spring 25, the pitch is to be varied, or the diameter of the coil is to be varied. In this case, in order to provide a curved coil axis, the relative relationship between the diameters of the approximately halves of circumferences in one coil has to be maintained.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A helical compression spring having a plurality of coils along a curved coil axis, wherein each coil constituting the helical compression spring is increased and decreased in diameter, and wherein the order of the increased diameter and the decreased diameter of each coil is reversed at a predetermined position on the longitudinal axis of the helical compression spring.

2. The helical compression spring of claim 1, wherein each coil constituting the coils between one end of the helical compression spring and the predetermined position is increased in diameter and then decreased in diameter, and wherein each coil constituting the coils between the predetermined position and the other one end of the helical compression spring is decreased in diameter and then increased in diameter.

3. The helical compression spring of claim 2, wherein one section of each coil having approximately a half of the circumference of each coil divided by a plane including the coil axis is increased in diameter, the other one section having approximately a half of the circumference of each coil is decreased in diameter.

4. A method for producing a helical compression spring having a plurality of coils along a curved coil axis, comprising:

forming each coil constituting the helical compression spring to be increased and decreased in diameter; and reversing the order of forming each coil to be increased in diameter and decreased in diameter at a predetermined position on the longitudinal axis of the helical compression spring.

5. The method for producing the helical compression spring of claim 4, wherein each coil constituting the coils between one end of the helical compression spring and the predetermined position is formed to be increased in diameter and then decreased in diameter, and wherein each coil constituting the coils between the predetermined position and the other one end of the helical compression spring is formed to be decreased in diameter and then increased in diameter.

6. The method for producing the helical compression spring of claim 5, wherein one section of each coil having approximately a half of the circumference of each coil divided by a plane including the coil axis is formed to be increased in diameter, the other one section having approximately a half of the circumference of each coil is formed to be decreased in diameter.

* * * * *